United States Patent
Kwon et al.

(10) Patent No.: US 8,727,821 B2
(45) Date of Patent: May 20, 2014

(54) APPARATUS AND METHOD FOR GENERATING ELECTRICITY IN LIQUEFIED NATURAL GAS CARRIER

(75) Inventors: Hyuk Kwon, Ansan-si (KR); Eun Bae Lee, Seoul (KR); Hyun Jin Kim, Gwangju (KR); Jung Ho Choi, Seoul (KR); Yong Seok Choi, Seoul (KR); Sung Geun Lee, Seoul (KR); Byung Sung Kim, Goyang-si (KR); Ki Seok Kim, Seoul (KR)

(73) Assignee: Daewoo Shipbuilding & Marine Engineering Co., Ltd., Seoul (KR)

( * ) Notice: Subject to any disclaimer, the term of this patent is extended or adjusted under 35 U.S.C. 154(b) by 0 days.

(21) Appl. No.: 13/382,512

(22) PCT Filed: May 7, 2010

(86) PCT No.: PCT/KR2010/002927
§ 371 (c)(1),
(2), (4) Date: Jan. 5, 2012

(87) PCT Pub. No.: WO2011/138988
PCT Pub. Date: Nov. 10, 2011

(65) Prior Publication Data
US 2012/0108117 A1   May 3, 2012

(51) Int. Cl.
*B63H 21/17*   (2006.01)

(52) U.S. Cl.
USPC ............................................................ 440/6

(58) Field of Classification Search
USPC ............................................................ 440/6
See application file for complete search history.

(56) References Cited

U.S. PATENT DOCUMENTS

2009/0215328 A1*   8/2009   Daffey .............................. 440/1

FOREIGN PATENT DOCUMENTS

| | | |
|---|---|---|
| EP | 0069717 A1 | 1/1983 |
| JP | 02-109792 A | 4/1990 |
| JP | 06-504873 A | 6/1994 |
| JP | 2004-051049 A | 2/2004 |
| JP | 2007-234573 A | 9/2007 |
| JP | 2008-108619 A | 5/2008 |
| KR | 10-1984-0001694 B1 | 10/1984 |
| KR | 20-0394721 Y1 | 9/2005 |
| KR | 10-2006-0121187 A | 11/2006 |
| KR | 10-2010-0031998 A | 3/2010 |
| WO | WO 92/07392 A1 | 4/1992 |

OTHER PUBLICATIONS

Japanese Office Action dated Dec. 19, 2013, issued in connection with corresponding Japanese Patent Application No. 2012-514871.

* cited by examiner

*Primary Examiner* — Stephen Avila
(74) *Attorney, Agent, or Firm* — Knobbe, Martens, Olson & Bear, LLP (57) ABSTRACT

Provided is an apparatus for generating electricity required by an LNG carrier which stores LNG, which is obtained by liquefying natural gas to ultra low temperature in a gas field, in an LNG storage tank and carries the stored LNG. The apparatus includes: a reformer reforming boil-off gas occurring in the LNG storage tank and producing synthetic gas; and a fuel cell generating electricity through an electrochemical reaction of the synthetic gas produced by the reformer.

25 Claims, 9 Drawing Sheets

APPARATUS AND METHOD FOR GENERATING ELECTRICITY IN LIQUEFIED NATURAL GAS CARRIER

TECHNICAL FIELD

The present invention relates to an apparatus and method for generating electricity in a liquefied natural gas (LNG) carrier, and more particularly, to an apparatus and method for generating electricity required in an LNG carrier which stores LNG, which is obtained by liquefying natural gas to ultra low temperature in a gas field, in an LNG storage tank and carries the stored LNG.

BACKGROUND ART

In general, an LNG carrier is a vessel which stores LNG, which is obtained by liquefying natural gas to an ultra-low temperature in a gas field is stored, in an LNG storage tank and carries the stored LNG.

Examples of a propulsion system of the LNG carrier may include a steam turbine propulsion system using steam, a diesel engine propulsion system having a diesel engine for propulsion, and a dual fuel electricity propulsion system having a dual fuel engine, a generator, and a propulsion electromotor. The steam turbine propulsion system has low propulsion efficiency. Therefore, the diesel engine propulsion system or the dual fuel electricity propulsion system having high propulsion efficiency is mainly used as the propulsion system of the LNG carrier.

The LNG carrier, to which the diesel engine propulsion system is applied, includes a generation diesel engine and a generator which are separately installed therein, in order to supply electricity to electricity facilities inside the LNG carrier, that is, basic electricity facilities and cargo-related electricity facilities inside the LNG carrier.

In the case of the LNG carrier to which the dual fuel electricity propulsion system is applied, the dual fuel engine and the generator generate electricity and supply the generated electricity to electricity facilities inside the LNG carrier as well as the propulsion electromotor. In order to obtain the required electricity, an increased number of dual fuel engines and generators are installed and operated.

Meanwhile, an environment-friendly fuel cell may be adopted to generate electricity required in a vessel. The fuel cell obtains electricity through an electrochemical reaction of fuel-cell fuel, for example, hydrogen or synthetic gas having hydrogen. Conventionally, when the fuel-cell fuel is hydrogen, a hydrogen tank is installed in the vessel to store the hydrogen, and the stored hydrogen is supplied to the fuel cell from the hydrogen tank. However, since such a hydrogen tank has a limited size, the amount of hydrogen stored in the hydrogen tank may be limited.

Therefore, since the vessel including the conventional fuel cell has a limitation in supplying fuel-cell fuel, only fuel cells having a small capacity have been inevitably used as the conventional fuel cell, and the conventional fuel cell has been applied only to small vessels which sail a short distance. Furthermore, since the electricity generation capacity of the fuel cell is small, there is a limitation in using electricity generated by the fuel cell for electricity facilities inside the vessel. In particular, when the vessel having the conventional fuel cell operates a propulsion electromotor by using only the electricity generated from the fuel cell without including a separate generation engine, electromotors having a small output are inevitably used as the propulsion electromotor, because the electricity generation capacity of the fuel cell is small. Accordingly, since the speed of the vessel does not only decrease, but also most power is consumed by the propulsion electromotor, there is a larger limitation in using the electricity generated by the fuel cell for the electricity facilities inside the vessel.

DISCLOSURE

Technical Problem

An embodiment of the present invention is directed to an apparatus and method for generating electricity, which is constructed to continuously supply fuel to a fuel cell during the operation of a vessel, when the fuel cell is adopted as a device for generating electricity required by a large vessel, such as an LNG carrier, which sails a long distance.

Technical Solution

According to an aspect of the present invention, there is provided an apparatus for generating electricity required by an LNG carrier which stores LNG, which is obtained by liquefying natural gas to ultra low temperature in a gas field, in an LNG storage tank and carries the stored LNG. The apparatus includes: a reformer reforming boil-off gas occurring in the LNG storage tank and producing synthetic gas; and a fuel cell generating electricity through an electrochemical reaction of the synthetic gas produced by the reformer.

The reformer may include a steam reformer which reforms the boil-off gas with steam and produces the synthetic gas.

The apparatus may further include a steam supply line supplying steam to the steam reformer, the steam subordinately occurring during the electrochemical reaction of the synthetic gas in the fuel cell.

The apparatus may further include a separator installed at a rear stage of the steam reformer and separating ash which subordinately occurs while the boil-off gas is reformed.

The apparatus may further include a compressor compressing air and supplying the compressed air to the fuel cell.

The apparatus may further include an electricity storage unit connected to the fuel cell and storing the electricity generated by the fuel cell.

The reformer, the separator, the fuel cell, the compressor, and the electricity storage unit may be provided as one fuel cell module.

The fuel cell may include any one of a molten carbonate fuel cell (MCFC), a solid oxide fuel cell (SOFC), and a polymer electrolyte membrane/proton exchange membrane fuel cell (PEMFC).

When the fuel cell is the SOFC, the fuel cell may include: a carbon dioxide collector collecting carbon dioxide which occurs while synthetic gas electrochemically reacts in the SOFC; and a carbon dioxide storage tank storing the carbon dioxide collected by the carbon dioxide collector.

The apparatus may further include a water gas shift reactor installed at a rear stage of the separator, causing carbon monoxide of the synthetic gas to react with water, and removing the carbon monoxide by converting the carbon monoxide into carbon dioxide, when the fuel cell is the PEMFC.

The apparatus may further include a carbon dioxide collector installed at a rear stage of the water gas shift reactor and collecting carbon dioxide which occurs while the water gas shift reactor removes the carbon monoxide; and a carbon dioxide storage tank storing the carbon dioxide collected by the carbon dioxide collector.

The reformer, the separator, the fuel cell, the carbon dioxide collector, the carbon dioxide storage tank, the compressor, and the electricity storage unit may be provided as one fuel cell module.

The reformer, the separator, the fuel cell, the water gas shift reactor, the carbon dioxide collector, the carbon dioxide storage tank, the compressor, and the electricity storage unit may be provided as one fuel cell module.

The LNG carrier may include a propulsion system.

The propulsion system may include a dual fuel electricity propulsion system having a dual fuel engine, a generator, and a propulsion electromotor, the generator may be connected to electricity facilities inside the LNG carrier and the propulsion electromotor, and the fuel cell module may be connected in parallel to the generator.

The propulsion system may include a diesel engine propulsion system having a propulsion diesel engine, and the fuel cell module may be connected to electricity facilities inside the LNG carrier.

The propulsion diesel engine may include a Man B&W engine gas injection (MEGI) engine.

When the fuel cell is the MCFC or the SOFC, the fuel cell may include a waste heat recovery system attached thereto and recovering heat produced from the fuel cell, the waste heat recovery system may be connected to a steam turbine and a condenser, and the steam turbine may be connected to the electricity storage unit.

When the fuel cell is the MCFC or the SOFC, the fuel cell may include a waste heat recovery system attached thereto and recovering heat produced from the fuel cell, and the waste heat recovery system may be connected to steam-using places inside the LNG carrier and a condenser.

When the fuel cell is the MCFC or the SOFC, the fuel cell may be connected to a burner to which high-temperature synthetic gas discharged from the fuel cell is supplied, the burner may be connected to a gas turbine, the gas turbine may be connected to an electricity storage unit, and the burner and the gas turbine may be connected to the compressor.

According to another aspect of the present invention, there is provided a method for generating electricity required by a LNG carrier which stores LNG, which is obtained by liquefying natural gas to ultra low temperature in a gas field, in an LNG storage tank and carries the stored LNG. The method includes: installing a fuel cell in the LNG carrier, the fuel cell generating electricity through an electrochemical reaction of synthetic gas; reforming boil-off gas occurring in the LNG storage tank and producing the synthetic gas; and supplying the produced synthetic gas to the fuel cell to generate electricity through an electrochemical reaction of the synthetic gas.

The boil-off gas may be reformed with steam to produce the synthetic gas.

Steam produced during the electrochemical reaction of the synthetic gas in the fuel cell may be used for the steam reforming.

When the fuel cell is the MCFC or the SOFC, carbon monoxide of the synthetic gas and hydrogen may be supplied to the fuel cell.

When the fuel cell is the PEMFC, carbon monoxide of the synthetic gas may be removed, and only hydrogen may be supplied to the fuel cell.

When the fuel cell is the MCFC or the SOFC, heat produced from the fuel cell may be used to produce steam, and the produced steam may be used to rotate a steam turbine to generate electricity.

When the fuel cell is the MCFC or the SOFC, the heat produced from the fuel cell may be used to produce steam, and the produced steam may be used for steam-using places inside the LNG carrier.

When the fuel cell is the MCFC or the SOFC, high-temperature synthetic gas discharged from the fuel cell may be burned to produce high-temperature and high-pressure gas, and the produced high-temperature and high-pressure gas may be used to rotate a gas turbine to generate electricity.

The LNG carrier may be propelled by a propulsion system.

The propulsion system may include a dual fuel electricity propulsion system having a dual fuel engine, a generator, and a propulsion electromotor, and the electricity produced by the fuel cell may be joined with electricity generated by the generator and then supplied to electricity facilities inside the LNG carrier and the propulsion electromotor.

The propulsion system may include a diesel engine propulsion system having a propulsion diesel engine, and the electricity produced by the fuel cell may be supplied to electricity facilities inside the LNG carrier.

It should be understood that different embodiments of the invention, including those described under different aspects of the invention, are meant to be generally applicable to all aspects of the invention. Any embodiment may be combined with any other embodiment unless inappropriate. All examples are illustrative and non-limiting.

Advantageous Effects

According to the embodiments of the present invention, the boil-off gas occurring in the LNG carrier may be reformed to produce fuel for the fuel cell, and the fuel produced in such a manner may be continuously supplied to the fuel cell. Therefore, the fuel cell may be adopted as a system for producing electricity required by a large vessel such as an LNG carrier, which sails a long distance.

BEST MODE FOR THE INVENTION

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 1:
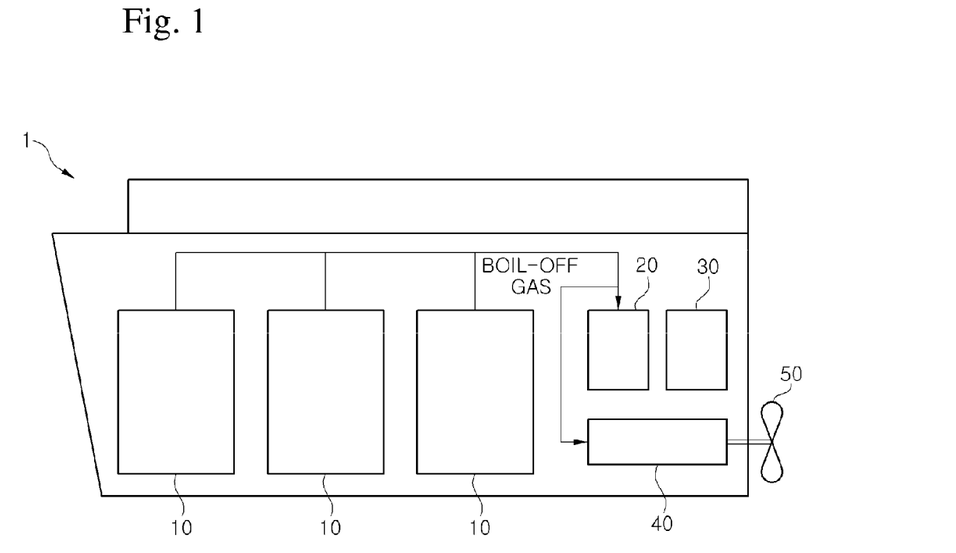
FIG. 1 is a schematic view of an LNG carrier according to an embodiment of the present invention.

FIG. 1 is a schematic view of an LNG carrier according to an embodiment of the present invention. The LNG carrier 1 of FIG. 1 includes an LNG storage tank 10, a fuel cell module 20, a diesel storage tank 30, a propulsion system 40, and a propeller 50.

The LNG storage tank 10 stores LNG which is obtained by liquefying natural gas to ultra low temperature. Since the liquefaction temperature of natural gas is as low as −163° C. at normal pressure, LNG tends to evaporate even when the temperature thereof is slightly higher than −163° C. at normal pressure.

Although the LNG storage tank 10 is thermally insulated, external heat is continuously transferred to the LNG. Therefore, while the LNG is carried by the LNG carrier, the LNG is continuously gasified inside the LNG storage tank 10, and thus boil-off gas occurs inside the LNG storage tank 10.

The boil-off gas occurring in the LNG storage tank 10 is supplied to the fuel cell module 20 and the propulsion system 40.

Figure 2:
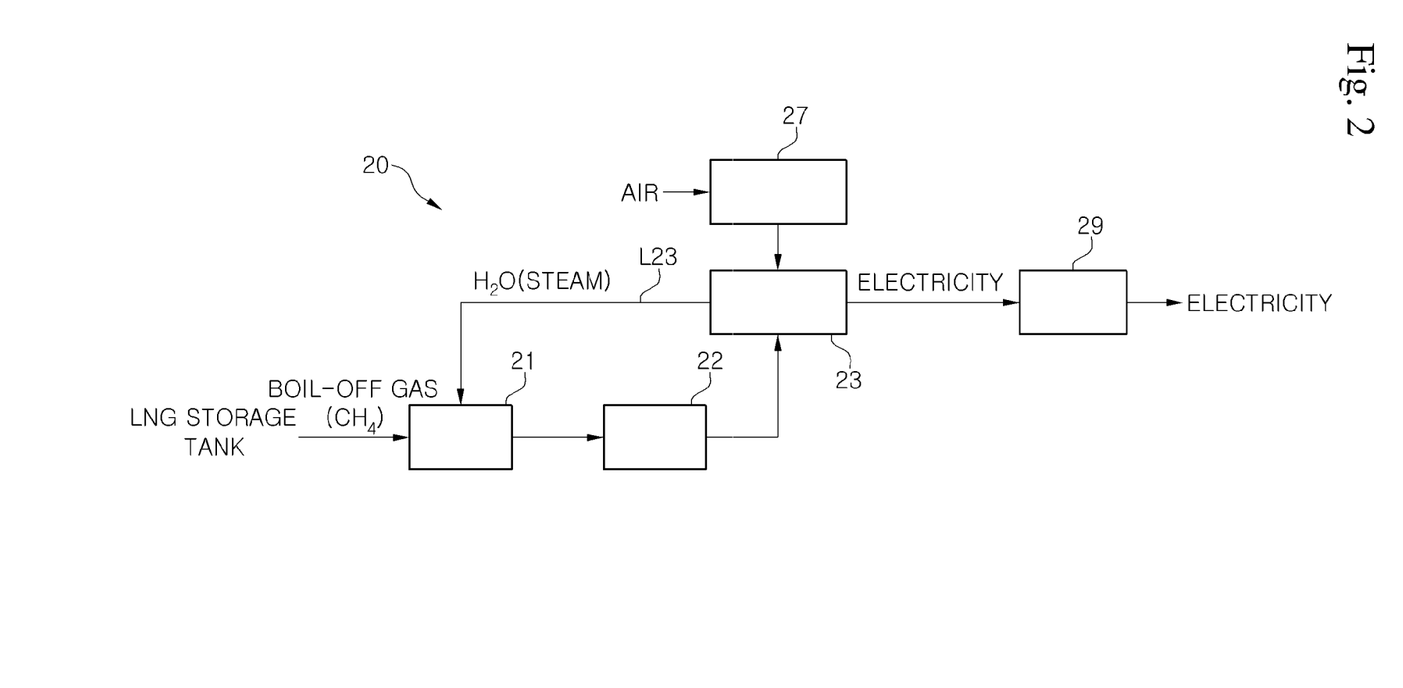
FIG. 2 is a block diagram illustrating blocks composing a fuel cell module according to an embodiment of the present invention.

FIG. 2 is a block diagram illustrating blocks composing the fuel cell module according to the embodiment of the present invention. Referring to FIG. 2, the fuel cell module 20 according to the embodiment of the present invention includes a steam reformer 21, a separator 22, a fuel cell 23, a compressor 27, and an electricity storage unit 29.

The boil-off gas occurring in the LNG storage tank 10 is supplied to the steam reformer 21. In this embodiment, the steam reformer which produces synthetic gas by reforming the boil-off gas with steam has been proposed as a reformer. However, the reformer may include an autothermal reformer, a carbon dioxide reformer, a partial oxidation reformer, and a steam and carbon dioxide reformer. The autothermal reformer produces synthetic gas by autothermally reforming boil-off gas with steam and oxygen. The carbon dioxide reformer produces synthetic gas by reforming boil-off gas with carbon dioxide. The partial oxidation reformer produces synthetic gas by partial-oxidation reforming boil-off gas with oxygen. The steam and carbon dioxide reformer produces synthetic gas by reforming boil-off gas with steam and carbon dioxide.

The process in which the steam reformer 21 produces synthetic gas by reforming the boil-off gas with steam may be expressed as a reaction formula below. The boil-off gas includes natural gas ($CH_4$) produced by the evaporation of LNG.

$$CH_4 + H_2O \rightarrow 3H_2 + CO$$

Here, the steam reforming is caused by a catalyst such as nickel (Ni). The steam reformer 21 produces hydrogen ($H_2$) and carbon monoxide (CO) as synthetic gas. While the boil-off gas is reformed, other materials are subordinately produced. In this specification, only $H_2$ and CO are referred to as synthetic gas. The other materials include ash and hydrogen sulfide ($H_2S$) produced when sulfur (S) contained in the boil-off gas is converted while the boil-off gas is reformed.

The synthetic gas produced by reforming the boil-off gas through the steam reformer 21 is supplied as fuel to the fuel cell 23. The fuel cell 23 generates electricity through an electrochemical reaction of the synthetic gas supplied from the steam reformer 21.

The separator 22 is installed at the rear stage of the steam reformer 21. The separator 22 serves to separate and remove the ash included in the other materials which are subordinately produced while the steam reformer 21 autothermally reforms the boil-off gas.

The fuel cell 23 is installed at the rear stage of the separator 22.

The compressor 27 serves to compress air and supply the compressed air to the fuel cell 23.

The electricity storage unit 29 is connected to the fuel cell 23 and stores the electricity generated by the fuel cell 23.

The steam reformer 21, the separator 22, the fuel cell 23, the compressor 27, and the electricity storage unit 29 are provided as one fuel cell module 20.

Furthermore, the steam reformer, the separator, the compressor, the fuel cell, and the electricity storage unit are based on well-known techniques, and thus the detailed descriptions of the constructions thereof are omitted in this specification.

Meanwhile, the fuel cell 23 may include any one of a molten carbonate fuel cell (MCFC), a solid oxide fuel cell (SOFC), and a polymer electrolyte membrane/proton exchange membrane fuel cell (PEMFC).

When the fuel cell 22 is the MCFC, carbon monoxide and hydrogen are supplied to the fuel cell 23 without removing the carbon monoxide from the synthetic gas. A process in which the MCFC generates electricity through an electrochemical reaction of hydrogen and carbon monoxide as synthetic gas may be expressed as a reaction formula below.

$$\text{Anode: } H_2 + CO_3^{-2} \rightarrow H_2O + CO_2 + 2e^-$$

$$CO + CO_3^{-2} \rightarrow 2CO_2 + 2e^-$$

$$CO + H_2O \rightarrow H_2 + CO_2$$

$$\text{Cathode: } 0.5O_2 + CO_2 + 2e^- \rightarrow CO_3^{-2}$$

$$\text{Entire reaction in fuel cell: } H_2 + 0.5O_2 + CO_2 \rightarrow H_2O + CO_2$$

Here, the carbon monoxide supplied to the fuel cell 23 with the hydrogen is used for the reaction in which the carbon monoxide reacts with water at the anode to produce hydrogen. At this time, carbon dioxide ($CO_2$) is generated. The generated carbon dioxide is sent to the cathode and used for the reaction in which carbon trioxide ($CO_3^{-2}$) is produced at the cathode. That is, when the fuel cell 23 is the MCFC, the carbon dioxide produced during the electricity generation is circulated inside the fuel cell without being discharged to the outside.

Furthermore, when the fuel cell is the SOFC, carbon monoxide and hydrogen are supplied to the fuel cell 23 without removing the carbon monoxide from the synthetic gas. A process in which the SOFC generates electricity through an electrochemical reaction of hydrogen and carbon monoxide as synthetic gas may be expressed as a reaction formula below.

Anode: $H_2 + O^{-2} \rightarrow H_2O + 2e^-$ $CO + O^{-2} \rightarrow CO_2 + 2e^-$ $CO + H_2O \rightarrow H_2 + CO_2$ Cathode: $0.5O_2 + 2e^- \rightarrow O^{-2}$ Entire reaction in fuel cell: $H_2 + 0.5O_2 \rightarrow H_2O$ Here, the carbon monoxide supplied to the fuel cell 23 with the hydrogen is used for the reaction in which the carbon monoxide reacts with water at the anode to produce hydrogen. At this time, carbon dioxide ($CO_2$) is produced. The produced carbon dioxide should be treated by a separate device.

Figure 3:
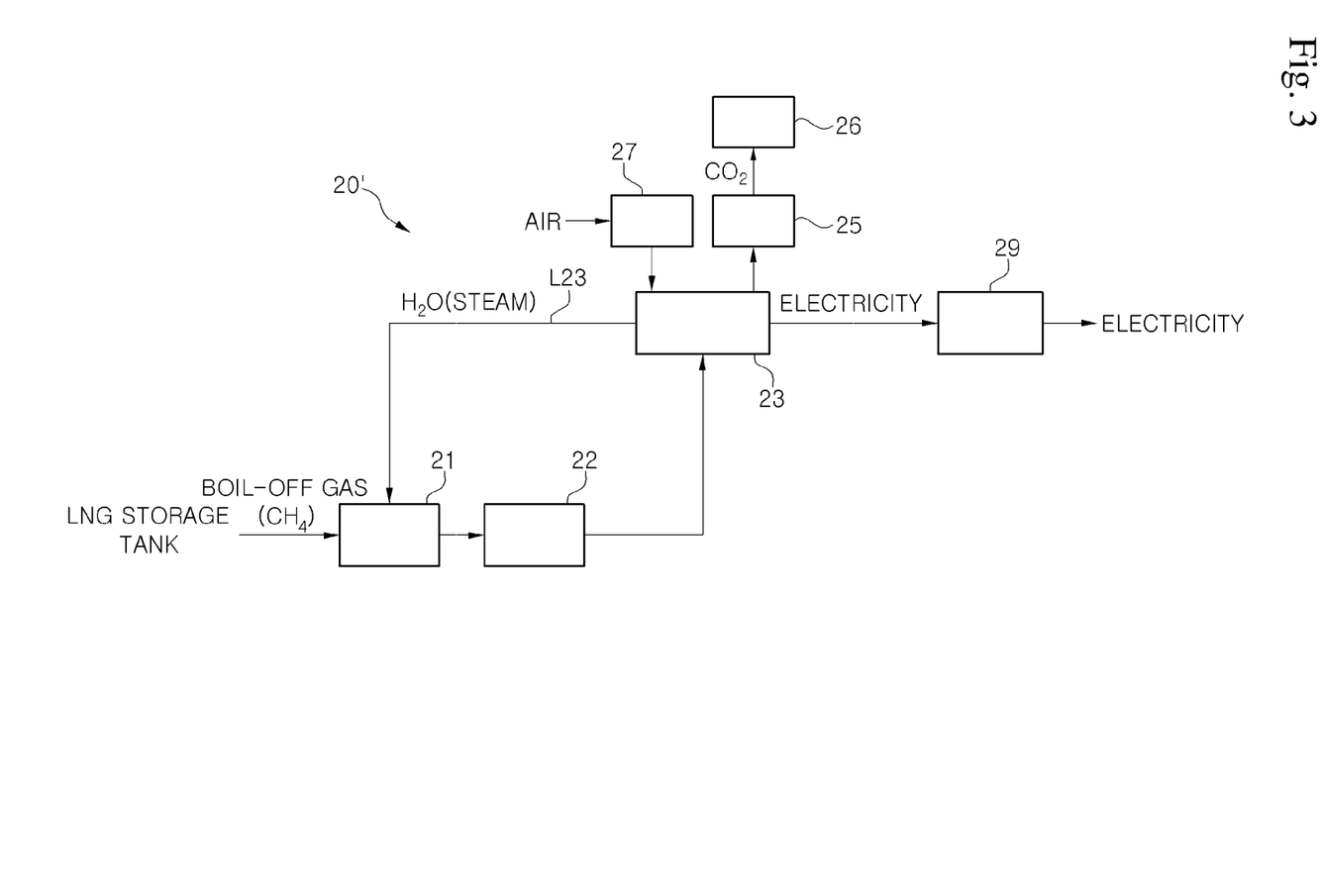
FIG. 3 is a block diagram illustrating blocks composing a fuel cell module according to another embodiment of the present invention.

Referring to FIG. 3, when the fuel cell 23 is the SOFC, the fuel cell 23 includes a carbon dioxide collector 25 to collect carbon dioxide, in order to treat the carbon dioxide produced during the process in which the synthetic gas electrochemically reacts in the fuel cell. The carbon dioxide collector 25 includes a carbon dioxide storage tank 26 for storing carbon dioxide collected by the carbon dioxide collector 25. FIG. 3 is a block diagram illustrating blocks composing a fuel cell module according to another embodiment of the present invention. In the fuel cell module 20' illustrated in FIG. 3, the same components as those of the fuel cell module 20 illustrated in FIG. 2 will be represented by the same reference numerals.

According to the fuel cell module of FIG. 3, when the fuel cell 23 is the SOFC, the carbon dioxide produced during the electrochemical reaction of the synthetic gas in the fuel cell is not discharged to the air, because the carbon dioxide collector 25 and the carbon dioxide storage tank 26 are installed in the fuel cell module 20'. Therefore, it is possible to solve an environmental pollution problem caused by the discharge of the carbon dioxide.

Furthermore, when the fuel cell 23 is the SOFC, the steam reformer 21, the separator 22, the fuel cell 23, the carbon dioxide collector 25, the carbon dioxide storage tank 26, the compressor 27, and the electricity storage unit 29 are provided as one fuel cell module 20', as illustrated in FIG. 3.

Meanwhile, when the fuel cell 23 is the PEMFC, carbon monoxide is removed from the synthetic gas, and only hydrogen is supplied to the fuel cell 23. A process in which the PEMFC generates electricity through an electrochemical reaction of hydrogen may be expressed as a reaction formula below.

Anode: $H_2 \rightarrow 2H^+ + 2e^-$

Cathode: $0.5O_2 + 2H^+ + 2e^- \rightarrow H_2O$

Entire reaction in fuel cell: $H_2 + 0.5O_2 \rightarrow H_2O$

Figure 4:
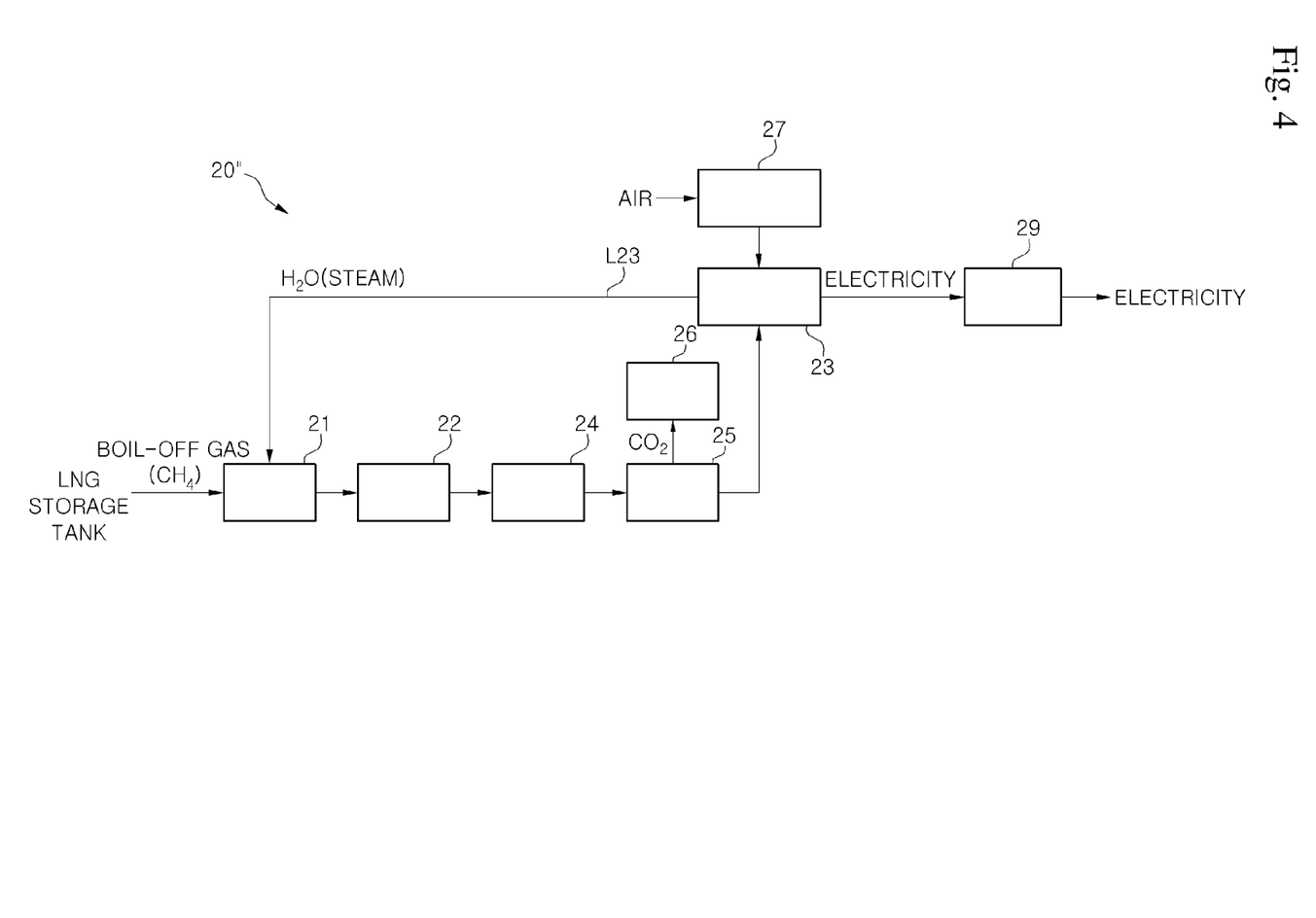
FIG. 4 is a block diagram illustrating blocks composing a fuel cell module according to another embodiment of the present invention.

Here, in order to remove the carbon monoxide from the synthetic gas, a water gas shift reactor 24 is installed at the rear stage of the separator 22, as illustrated in FIG. 4. The water gas shift reactor 24 converts the carbon monoxide into carbon dioxide through a reaction between the carbon monoxide of the synthetic gas and water, thereby removing the carbon monoxide.

FIG. 4 is a block diagram illustrating blocks composing a fuel cell module according to another embodiment of the present invention. In the fuel cell module 20'' illustrated in FIG. 4, the same components as those of the fuel cell module 20 illustrated in FIG. 2 will be represented by the same reference numerals.

The water gas shift reactor 24 converts hydrogen sulfide ($H_2S$), which is produced when sulfur (S) contained in boil-off gas is converted during the reforming process of the boil-off gas, into sulphuric acid ($H_2SO_4$) through a reaction between the hydrogen sulfide ($H_2S$) and water, thereby removing the hydrogen sulfide ($H_2S$). The liquid sulphuric acid ($H_2SO_4$) is discharged from the water gas shift reactor 24, and then stored in a separate container (not illustrated).

The processes in which the water gas shift reactor 24 converts the carbon monoxide and the hydrogen sulfide of the synthetic gas into carbon dioxide and sulphuric acid, respectively, may be expressed as reaction formulas below.

$CO + H_2O \rightarrow CO_2 + H_2$ $H_2S + 4H_2O \rightarrow H_2SO_4 + 4H_2$

The hydrogen ($H_2$) produced by the water gas shift reactor 24 is supplied as fuel to the fuel cell 23.

The carbon dioxide collector 25 is installed at the rear stage of the water gas shift reactor 24. The carbon dioxide collector 25 serves to collect the carbon dioxide ($CO_2$) produced from the water gas shift reactor 24.

The carbon dioxide collector 25 is connected to a carbon dioxide storage tank 26 for storing the carbon dioxide ($CO_2$) collected by the carbon dioxide collector 25. According to the fuel cell module 20'' of FIG. 4, when the fuel cell 23 is the PEMFC, the carbon dioxide produced during the process of removing the carbon monoxide contained in the synthetic gas supplied to the fuel cell 23 is not discharged to the air, because the carbon diode collector 25 and the carbon dioxide storage tank 26 are installed in the fuel cell module 20''. Therefore, it is possible to solve an environmental pollution problem caused by the discharge of the carbon dioxide.

The hydrogen ($H_2$) produced by the water gas shift reactor 24 is supplied as fuel to the fuel cell 23.

Furthermore, when the fuel cell 23 is the PEMFC, the steam reformer 21, the separator 22, the fuel cell 23, the water gas shift reactor 24, the carbon dioxide collector 25, the carbon dioxide storage tank 26, the compressor 27, and the electricity storage unit 29 are provided as one fuel cell module 20'', as illustrated in FIG. 4.

The water gas shift reactor and the carbon dioxide collector are based on well-known techniques, and thus the detailed descriptions of the constructions thereof are omitted in this specification.

While the synthetic gas electrochemically reacts in the fuel cell 23, steam ($H_2O$) is subordinately produced. This steam is supplied to the steam reformer 21 through a steam supply line L23 and used for reforming boil-off gas in the steam reformer 21.

The operation temperature of the MCFC corresponds to 650° C., and the operation temperature of the SOFC ranges from 650 to 1,000° C. Therefore, when the fuel cell is the MCFC or the SOFC, high-temperature heat is generated from the fuel cell. However, the high-temperature heat generated from the fuel cell is generally discarded.

Accordingly, an embodiment of the present invention proposes a method for increasing generation efficiency by using the waste heat discarded by the fuel cell, when the fuel cell is the MCFC or the SOFC.

Figure 5:
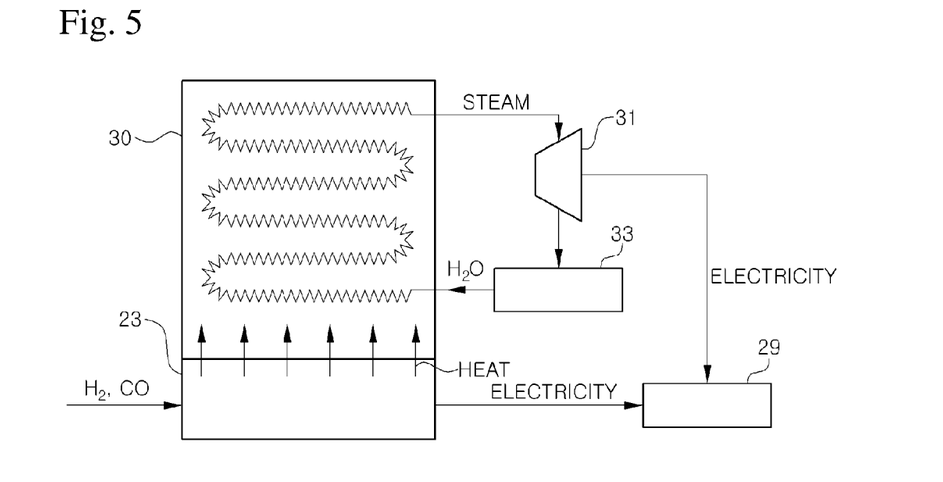
FIG. 5 is a schematic view illustrating an apparatus for increasing generation efficiency by using waste heat discarded by the fuel cell according to the embodiment of the present invention.

FIG. 5 is a schematic view illustrating an apparatus for increasing generation efficiency by using waste heat discarded by a fuel cell, when the fuel cell is the MCFC or the SOFC. Referring to FIG. 5, the fuel cell 23 includes a waste heat recovery system 30 attached thereto. The waste heat recovery system 30 serves to recover heat generated by the fuel cell 23. The waste heat recovery system 30 may include a heat exchanger. The waste heat recovery system 30 is connected to a steam turbine 31 and a condenser 33, and the steam turbine 31 is connected to the electricity storage unit 29.

The waste heat recovery system 30 serves to convert water into high-temperature and high-pressure steam by using the heat generated from the fuel cell 23.

The high-temperature and high-pressure steam produced by the waste heat recovery system 30 is transferred to the steam turbine 31, and rotates the steam turbine 31 to generate electricity. The electricity generated by the steam turbine 31 is stored in the electricity storage unit 29.

After rotating the steam turbine 31, the steam is sent to the condenser 33 to condense the steam. The condensed water is sent to the waste heat recovery system 30.

Figure 6:
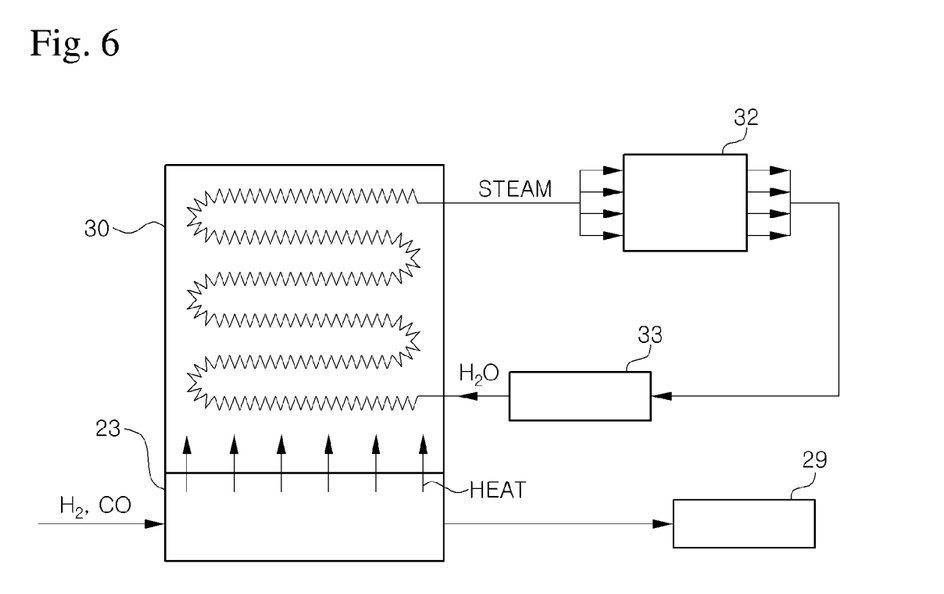
FIG. 6 schematically illustrates an apparatus which is constructed in such a manner that waste heat discarded by the fuel cell according to the embodiment of the present invention is used in a steam-using place inside the LNG carrier.

Furthermore, the high-temperature and high-pressure steam produced by the waste heat recovery system 30 may be used in a steam-using place inside the vessel. FIG. 6 illustrates an apparatus which is constructed in such a manner that steam produced by the waste heat recovery system 30 is sent to a steam-using place 32 inside the LNG carrier. Therefore, the waste heat recovery system 30 is connected to the steam-using place 32 inside the LNG carrier and the condenser 33. After being used in the steam-using place 32, the steam is sent to the condenser 33 to condense the steam. Then, the condensed water is sent to the waste heat recovery system 30.

Figure 7:
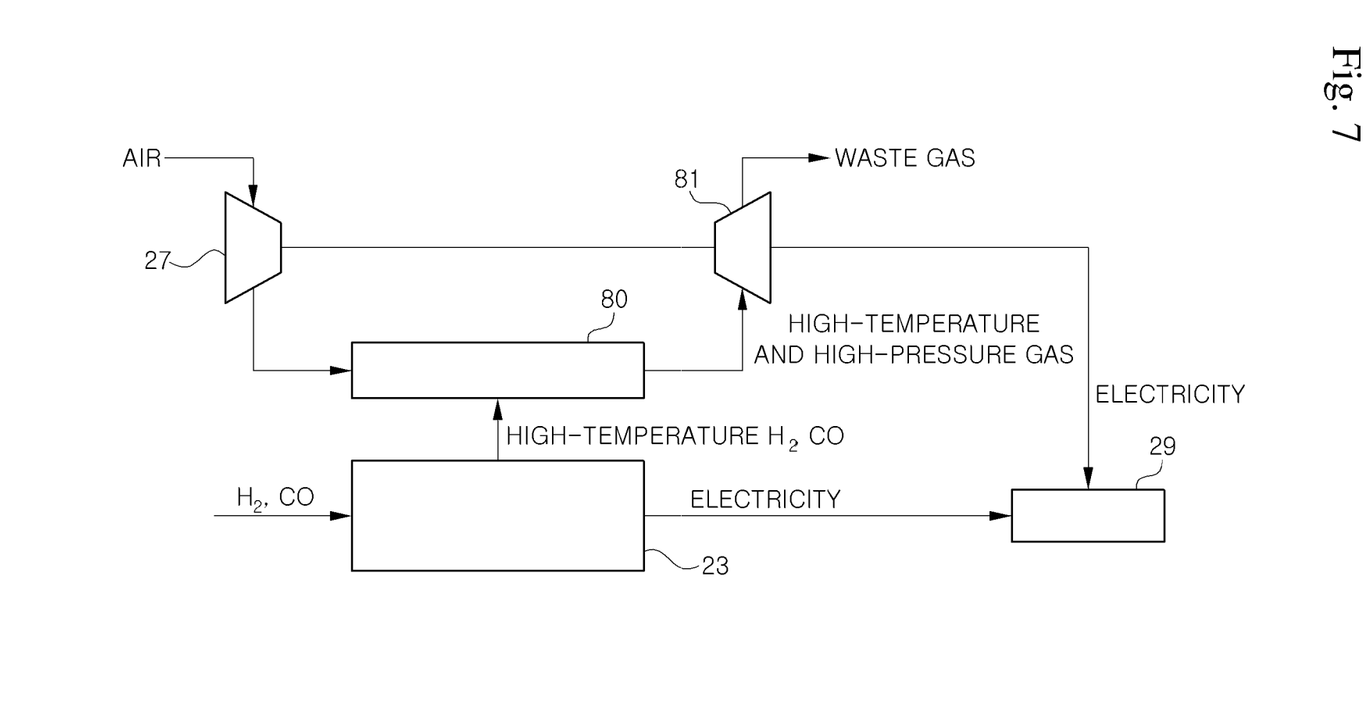
FIG. 7 is a schematic view illustrating an apparatus for increasing generation efficiency by using high-temperature synthetic gas discharged from the fuel cell according to the embodiment of the present invention.

Furthermore, when the fuel cell is the MCFC or the SOFC, a part of the synthetic gas supplied to the fuel cell is discharged in a high-temperature state without electrochemically reacting in the fuel cell. The high-temperature synthetic gas discharged from the fuel cell may be used to increase generation efficiency.

FIG. 7 is a schematic view illustrating an apparatus for increasing generation efficiency by using high-temperature synthetic gas discharged from the fuel cell, when the fuel cell is the MCFC or the SOFC. Referring to FIG. 7, the fuel cell 23 is connected to a burner 80 to which the high-temperature synthetic gas discharged from the fuel cell 23 is supplied. The burner 80 is connected to a gas turbine 81, and the gas turbine 81 is connected to the electricity storage unit 29. Furthermore, since the burner 80 and the gas turbine 81 are connected to the compressor 27, the compressor 27 supplies high-pressure air to the burner 80 and the gas turbine 81.

The burner 80 serves to burn the high-temperature synthetic gas discharged from the fuel cell 23 with the high-temperature air and converts the synthetic gas into high-temperature and high-pressure gas.

The high-temperature and high-pressure gas produced from the burner 80 is sent to the gas turbine 81, and rotates the gas turbine 81 to generate electricity. The electricity generated by the gas turbine 81 is stored in the electricity storage unit 29.

After rotating the gas turbine 81, the gas is discharged to the outside.

Figure 8:
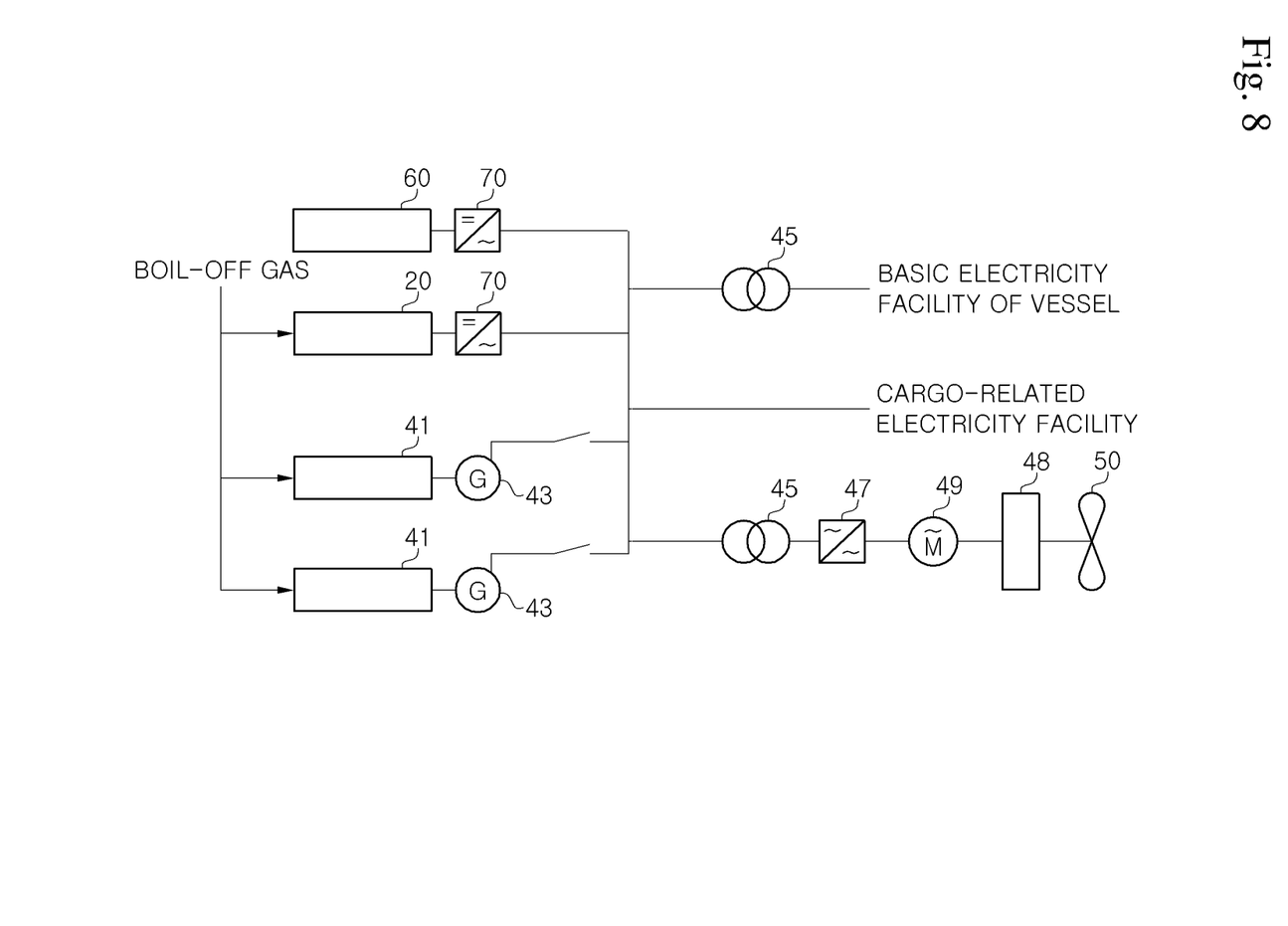
FIG. 8 is a schematic view illustrating the connection relationships among the respective components inside the LNG carrier, when a propulsion system of the LNG carrier according to the embodiment of the present invention is a dual fuel electricity propulsion system.

FIG. 8 is a schematic view illustrating the connection relationships among the respective components inside the LNG carrier, when the propulsion system of the LNG carrier according to the embodiment of the present invention is a dual fuel electricity propulsion system.

In the LNG carrier, the dual fuel electricity propulsion system includes a dual fuel engine 41, a generator 43, an AC/AC converter 45, a transformer 47, and a propulsion electromotor 49. The propulsion electromotor 49 serves to drive the propeller 50 through a clutch 48.

The generator 43 is connected to electricity facilities inside the LNG carrier and the propulsion electromotor 49. The electricity facilities inside the LNG carrier include basic electricity facilities of the LNG carrier and cargo-related electricity facilities. FIG. 8 illustrates that two dual fuel engines 41 and two generators 43 are installed, and one fuel cell module 20 is installed. The fuel cell module 20 is connected in parallel to the generator 43. Therefore, the electricity generated from the fuel cell module 20 is joined with the electricity generated from the generator 43 and then supplied to the electricity facilities inside the LNG carrier and the propulsion electromotor 49. The fuel cell module 20 and the generators 43 are connected in parallel to a battery 60, and DC/AC converters 70 are disposed at the rear stages of the fuel cell module 20 and the battery 60, respectively. For example, when the LNG carrier enters or leaves a port, the power consumption thereof is small, and the discharge of waste gas around the port needs to be reduced. Therefore, the dual fuel cell engine 41 which has a large electricity generation capacity and discharges a large amount of waste gas may not be operated, but only the fuel cell module 20 which has a small electricity generation capacity and is constructed in an environmentally-friendly manner may be operated to drive the propulsion electromotor 49 and the electricity facilities inside the LNG carrier by using only the electricity generated from the fuel cell module 20 and the electricity stored in the battery 60. Meanwhile, when the LNG carrier normally sails, the power consumption thereof is large, and the discharge of waste gas is relatively free. Therefore, both of the dual fuel engine 41 and the fuel cell module 20 may be operated to drive the propulsion electromotor 49 and the electricity facilities inside the LNG carrier by using the electricity generated by the dual fuel engine 41 and the fuel cell module 20. At this time, the electricity generated by the dual fuel engine 41 and the fuel cell module 20 charges the battery 60.

When the LNG carrier includes the dual fuel electricity propulsion system as a propulsion system, three dual fuel engines and three generators were installed in the related art, but two dual fuel engines 41, two generators 43, and one fuel cell module 20 are installed in the embodiment of the present invention.

Figure 9:
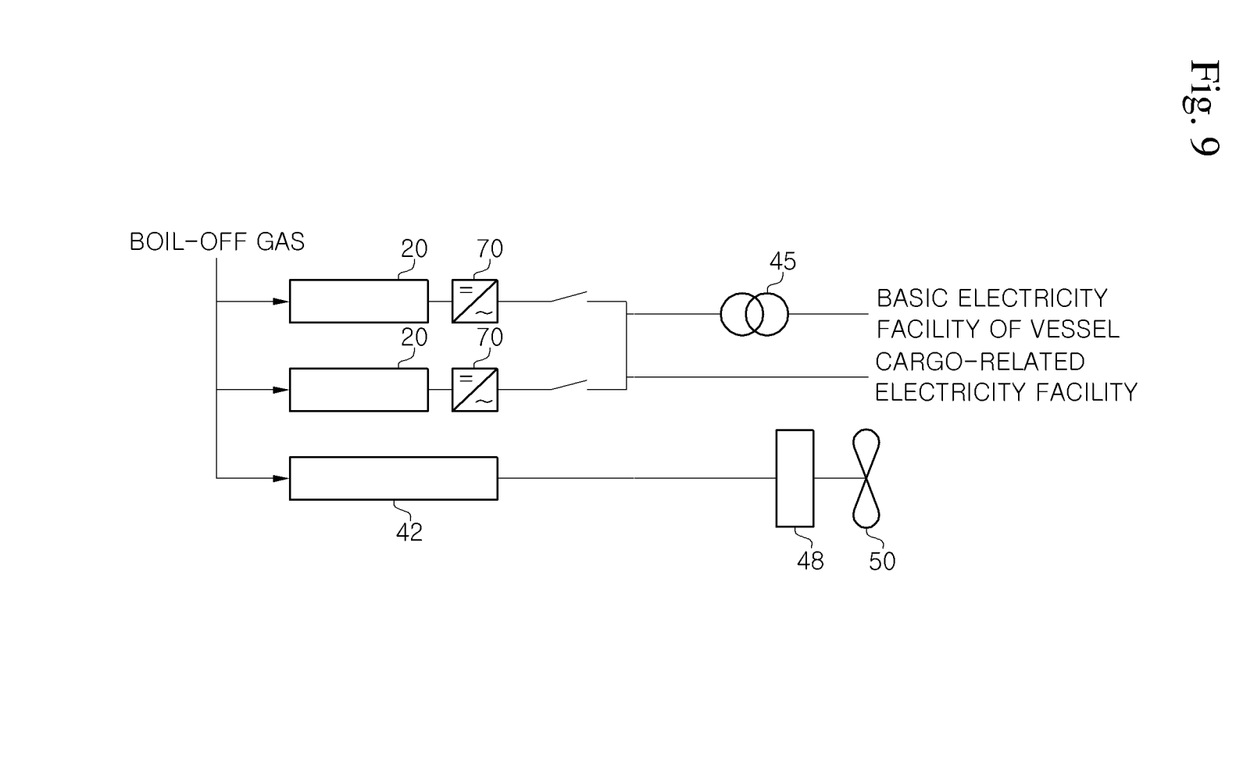
FIG. 9 is a schematic view illustrating the connection relationships among the respective components inside the LNG carrier, when a propulsion system of the LNG carrier according to the embodiment of the present invention is a diesel engine propulsion system.

FIG. 9 is a schematic view illustrating the connection relationships among components inside the LNG carrier, when the LNG carrier according to the embodiment of the present invention includes a diesel engine propulsion system as a propulsion system.

In the LNG carrier, the diesel engine propulsion system includes a diesel engine 42. The diesel engine 42 drives the propeller 50 through a clutch 48.

FIG. 9 illustrates that two fuel cell modules 20 are installed. The fuel cell modules 20 are connected to electricity facilities inside the LNG carrier, that is, basic electricity facilities inside the LNG carrier and cargo-related electricity facilities. Therefore, electricity generated by the fuel cell module 20 is supplied to the electricity facilities inside the LNG carrier, that is, basic electricity facilities inside the LNG carrier and cargo-related electricity facilities. At the rear stages of the fuel cell modules 20, DC/AC converters 70 are respectively disposed.

When the LNG carrier includes the diesel engine propulsion system as a propulsion system, two generation diesel engines and two generators were installed in the related art, but only two fuel cell modules 20 are installed without the generation diesel engines and the generators in the embodiment of the present invention.

Here, the propulsion diesel engine may include a Man B&W engine gas injection (MEGI) engine which is a high-pressure gas injection engine made by Man B&W Diesel.

According to the embodiments of the present invention, the boil-off gas occurring in the LNG carrier may be reformed to produce fuel for the fuel cell, and the fuel produced in such a manner may be continuously supplied to the fuel cell. Therefore, the fuel cell may be adopted as a system for producing electricity required by a large vessel such as an LNG carrier, which sails a long distance.

In the above-described embodiments, the LNG carrier includes the fuel combustion engine, such as the dual fuel engine or the propulsion diesel engine, and the fuel cell module which is constructed to continuously supply the fuel, which is obtained by reforming the boil-off gas occurring in the LNG carrier, to the fuel cell. The LNG carrier may not include a separate fuel combustion engine such as the dual fuel engine or the diesel engine, but may include only the fuel cell module. In this case, only the electricity generated by the fuel cell module may be used to drive the propulsion electromotor to propel the LNG carrier and operate the electricity facilities inside the LNG carrier.

While the present invention has been described with respect to the specific embodiments, it will be apparent to those skilled in the art that various changes and modifications may be made without departing from the spirit and scope of the invention as defined in the following claims.

The invention claimed is:

1. An apparatus for generating electricity in a liquefied natural gas (LNG) carrier having an LNG storage tank, the apparatus comprising:
    a reformer configured for reforming boil-off gas from the LNG storage tank using steam to produce synthetic gas;
    a separator installed at a rear stage of the steam reformer and configured for separating ash while the boil-off as is being reformed;
    a fuel cell configured for generating electricity through an electrochemical reaction of the synthetic gas produced by the reformer;
    a compressor configured for compressing air and for supplying the compressed air to the fuel cell; and
    an electricity storage unit connected to the fuel cell and configured for storing electricity generated by the fuel cell,
    wherein the reformer, the separator, the fuel cell, the compressor, and the electricity storage unit are provided as a single module.

2. The apparatus according to claim 1, further comprising a steam supply line supplying to the steam reformer steam generated during the electrochemical reaction of the synthetic gas in the fuel cell.

3. The apparatus according to claim 1, wherein the fuel cell comprises any one of a molten carbonate fuel cell (MCFC), a solid oxide fuel cell (SOFC), and a polymer electrolyte membrane/proton exchange membrane fuel cell (PEMFC).

4. The apparatus according to claim 3, wherein, when the fuel cell is the SOFC, the fuel cell comprises:
    a carbon dioxide collector configured for collecting carbon dioxide which occurs while synthetic gas electrochemically reacts in the SOFC; and
    a carbon dioxide storage tank configured for storing the carbon dioxide collected by the carbon dioxide collector.

5. The apparatus according to claim 3, further comprising a water gas shift reactor installed at a rear stage of the separator, configured for causing carbon monoxide of the synthetic gas to react with water, and configured for removing the carbon monoxide by converting the carbon monoxide into carbon dioxide, when the fuel cell is PEMFC.

6. The apparatus according to claim 5, further comprising:
    a carbon dioxide collector installed at a rear stage of the water gas shift reactor and configured for collecting carbon dioxide which occurs while the water gas shift reactor removes the carbon monoxide; and
    a carbon dioxide storage tank configured for storing the carbon dioxide collected by the carbon dioxide collector.

7. The apparatus according to claim 4, wherein the reformer, the separator, the fuel cell, the carbon dioxide collector, the carbon dioxide storage tank, the compressor, and the electricity storage unit are provided as a single.

8. The apparatus according to claim 6, wherein the reformer, the separator, the fuel cell, the water gas shift reactor, the carbon dioxide collector, the carbon dioxide storage tank, the compressor, and the electricity storage unit are provided as in a single module.

9. The apparatus according to claim 1, wherein the LNG carrier comprises a propulsion system.

10. The apparatus according to claim 9, wherein the propulsion system comprises a dual fuel electricity propulsion system including a dual fuel engine, a generator, and a propulsion electromotor,
    the generator is connected to electricity consumption facilities inside the LNG carrier and the propulsion electromotor, and
    the fuel cell is connected in parallel to the generator.

11. The apparatus according to claim 9, wherein the propulsion system comprises a diesel engine propulsion system including a propulsion diesel engine, and
    the fuel cell is connected to electricity consumption facilities inside the LNG carrier.

12. The apparatus according to claim 11, wherein the propulsion diesel engine comprises a Man B&W engine gas injection (MEGI) engine.

13. The apparatus according to claim 3, wherein, when the fuel cell is the MCFC or the SOFC, the fuel cell comprises a waste heat recovery system attached thereto and recovering heat produced from the fuel cell, the waste heat recovery system is connected to a steam turbine and a condenser, and the steam turbine is connected to the electricity storage unit.

14. The apparatus according to claim 3, wherein, when the fuel cell is the MCFC or the SOFC, the apparatus further comprises a waste heat recovery system connected to the fuel cell and configured for recovering heat generated from the fuel cell, and the waste heat recovery system is connected to a steam-consuming device inside the LNG carrier and a condenser.

15. The apparatus according to claim 3, wherein, when the fuel cell is the MCFC or the SOFC, the fuel cell is connected to a burner to which high-temperature synthetic gas discharged from the fuel cell is supplied, the burner is connected to a gas turbine, the gas turbine is connected to an electricity storage unit, and the burner and the gas turbine are connected to the compressor.

16. A method for generating electricity in an LNG carrier having an LNG storage tank, the method comprising:
    providing a fuel cell in the LNG carrier, the fuel cell comprising a molten carbonate fuel cell (MCFC) or a solid oxide fuel cell (SOFC) for generating electricity through an electrochemical reaction;
    reforming boil-off gas from in the LNG storage tank to produce synthetic gas comprising carbon monoxide and hydrogen; and supplying the synthetic gas to the fuel cell to generate electricity through an electrochemical reaction of the synthetic gas.

17. The method according to claim 16, wherein the boil-off gas is reformed with steam to produce the synthetic gas.

18. The method according to claim 17, wherein steam produced during the electrochemical reaction of the synthetic gas in the fuel cell is used for the reforming the boil-off gas.

19. A method for generating electricity in an LNG carrier having an LNG storage tank, the method comprising:
providing a fuel cell in the LNG carrier, the fuel cell comprising a polymer electrolyte membrane/proton exchange membrane fuel cell (PEMFC) configured for generating electricity through an electrochemical reaction;
reforming boil-off gas from in the LNG storage tank to produce synthetic gas comprising carbon monoxide and hydrogen;
removing carbon monoxide from the synthetic gas to provide hydrogen;
supplying the hydrogen to the fuel cell to generate electricity.

20. The method according to claim 16, wherein, when the fuel cell is the MCFC or the SOFC, heat produced from the fuel cell is used to produce steam, and the produced steam is used to rotate a steam turbine to generate electricity.

21. The method according to claim 16, wherein, when the fuel cell is the MCFC or the SOFC, the heat produced from the fuel cell is used to produce steam, and the produced steam is used for steam-using places inside the LNG carrier.

22. The method according to claim 16, wherein, when the fuel cell is the MCFC or the SOFC, high-temperature synthetic gas discharged from the fuel cell is burned to produce high-temperature and high-pressure gas, and the produced high-temperature and high-pressure gas is used to rotate a gas turbine to generate electricity.

23. The method according to claim 16, wherein the LNG carrier is propelled by a propulsion system.

24. The method according to claim 23, wherein the propulsion system comprises a dual fuel electricity propulsion system including a dual fuel engine, a generator, and a propulsion electromotor, and
wherein the electricity produced by the fuel cell is supplied along with electricity from the generator to electricity consumption facilities inside the LNG carrier and the propulsion electromotor.

25. The apparatus according to claim 23, wherein the propulsion system comprises a diesel engine propulsion system including a propulsion diesel engine, and
the electricity produced by the fuel cell is supplied to electricity consumption facilities inside the LNG carrier.

* * * * *

UNITED STATES PATENT AND TRADEMARK OFFICE
CERTIFICATE OF CORRECTION

PATENT NO. : 8,727,821 B2  
APPLICATION NO. : 13/382512  
DATED : May 20, 2014  
INVENTOR(S) : Hyuk Kwon et al.

Page 1 of 1

It is certified that error appears in the above-identified patent and that said Letters Patent is hereby corrected as shown below:

In the Drawings

On Sheet 7 of 9, in Fig. 7, change "HIGH-TEMPERATURE $H_2$ CO" to --HIGH-TEMPERATURE $H_2$, CO--.

In the Claims

At Column 11, Line 35, in Claim 1, change "as" to --gas--.
At Column 11, Line 43, in Claim 1, after "storing" insert --the--.
At Column 12, Line 15, in Claim 7, change "single." to --single module.--.

Signed and Sealed this  
Thirty-first Day of March, 2015

Michelle K. Lee  
*Director of the United States Patent and Trademark Office*